(12) United States Patent
Chen et al.

(10) Patent No.: US 10,176,800 B2
(45) Date of Patent: Jan. 8, 2019

(54) PROCEDURE DIALOGS USING REINFORCEMENT LEARNING

(71) Applicant: International Business Machines Corporation, Armonk, NY (US)

(72) Inventors: Hao Chen, Beijing (CN); Qi Cheng Li, Beijing (CN); Shao Chun Li, Beijing (CN); Jie Ma, Beijing (CN); Li Jun Mei, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/429,376

(22) Filed: Feb. 10, 2017

(65) Prior Publication Data

US 2018/0233128 A1 Aug. 16, 2018

(51) Int. Cl.
*G10L 15/06* (2013.01)
*G10L 15/22* (2006.01)

(52) U.S. Cl.
CPC ............ *G10L 15/063* (2013.01); *G10L 15/22* (2013.01); *G10L 2015/0638* (2013.01)

(58) Field of Classification Search
CPC .................. G10L 15/063; G10L 15/22; G10L 2015/0638
USPC ........................................................ 704/204
See application file for complete search history.

(56) References Cited

U.S. PATENT DOCUMENTS

| | | | |
|---|---|---|---|
| 7,039,644 B2 | 5/2006 | Hind et al. | |
| 7,386,839 B1 | 7/2008 | Golender et al. | |
| 8,612,233 B2 | 12/2013 | Anand et al. | |
| 8,892,539 B2 | 11/2014 | Anand et al. | |
| 9,471,872 B2 | 10/2016 | Anand et al. | |
| 2002/0087949 A1 | 7/2002 | Golender et al. | |
| 2006/0165040 A1* | 7/2006 | Rathod | G06Q 10/10 370/335 |
| 2010/0318846 A1 | 12/2010 | Sailer et al. | |
| 2012/0265528 A1* | 10/2012 | Gruber | G10L 15/18 704/235 |
| 2014/0006319 A1 | 1/2014 | Anand et al. | |
| 2016/0171119 A1 | 6/2016 | Bufe et al. | |

OTHER PUBLICATIONS

Li, Jiwei, Will Monroe, Alan Ritter, Michel Galley, Jianfeng Gao, and Dan Jurafsky. 2016. "Deep Reinforcement Learning for Dialogue Generation." arXiv, EBSCOhost.*
Li, Jiwei, Will Monroe, Alan Ritter, Michel Galley, Jianfeng Gao, and Dan Jurafsky. 2016. "Deep Reinforcement Learning for Dialogue Generation." arXiv, EBSCOhost. 2016.*
Volkova, S., et al., "Lightly Supervised Learning of Procedural Dialog Systems", Proceedings of the Association for Computational Linguistics, Aug. 4-9, 2013, pp. 1-11.

(Continued)

*Primary Examiner* — Bharatkumar S Shah
(74) *Attorney, Agent, or Firm* — Fleit Gibbons Gutman Bongini Bianco PL; Jon A. Gibbons

(57) ABSTRACT

Procedure dialogs are improved through knowledge mining within a reinforcement learning framework. Taking an existing procedure dialog as input, a machine learning model is generated. User interactions with the machine learning model are monitored and used to update the machine learning model. The updates to the machine learning model are applied to the existing procedure dialog for review and revision by subject matter experts.

18 Claims, 8 Drawing Sheets

(56) References Cited

OTHER PUBLICATIONS

Young, S., et al., "POMDP-based Statistical Spoken Dialogue Systems: a Review", Proceedings of the IEEE, Jan. 2012, pp. 1-18.
Werlinger, R., et al., "Preparation, detection, and analysis: the diagnostic work of IT security incident response", Information Management & Computer Security, Information Management & Computer Security, 2010, pp. 1-17, vol. 18, No. 1.
Caldeira, J., et al., "Influential Factors on Incident Management: Lessons Learned from a Large Sample of Products in Operation", Proceedings of the Ninth International Conference on Product Focused Software Process Improvement, Jun. 23-25, 2008, pp. 1-15.
Hanemann, A., "Automated IT Service Fault Diagnosis Based on Event Correlation Techniques", Doctoral Dissertation submitted on May 22, 2007, Ludwig Maximilian University of Munich, pp. 1-343.
ITIL, "ITIL Incident Management—The ITIL Open Guide", http://www.itlibrary.org/index.phppage=Incident_Management, last visited on Nov. 16, 2016, pp. 1-2.
The IT Service Management Forum, "What's happening at your LIG?", http://www.itsmfusa.org/, last visited on Nov. 16, 2016, pp. 1-2.
IBM, "Building a Dialog", https://www.ibm.com/watson/developercloud/doc/conversation/advanced_overview.shtml, last visited on Oct. 13, 2016, pp. 1-10.
Sutton, R., et al., "Reinforcement Learning: An Introduction", Second edition, in progress, 2012, pp. 1-334.
Ginzburg, J., et al., "Computational Models of Dialogue", Handbook of Computational Linguistics and Natural Language, Oxford. Blackwell, 2010, pp. 1-64.
Hijjawi, M., et al., "User's Utterance Classification Using Machine Learning for Arabic Conversational Agents", Proceedings of the 5th International Conference on Computer Science and Information Technology (CSIT), Mar. 27-28, 2013, pp. 1-10.
Anand, R., et al., "The Dialog Manager", Proceedings of the IEEE International Conference on Service Operations and Logistics, and Informatics, Jul. 28-30, 2013, pp. 1-6.
U.S. Appl. No. 14/075,796, filed on Nov. 8, 2013.

\* cited by examiner

PROCEDURE DIALOGS USING REINFORCEMENT LEARNING

BACKGROUND

The present disclosure generally relates to artificial intelligence and more specifically relates to automatic procedure dialog knowledge mining.

At a high level, the knowledge held by an enterprise can be categorized as follows:

Imperatives: strategy goals and operating plans.

Patterns: predictive models that have a certain longevity, durability, and level of universality.

Rules: algorithms and heuristic logic models that define a basic set of guidelines for performing in particular environments.

Procedural knowledge: the knowledge exercised in the performance of a task.

SUMMARY

Briefly, in one embodiment of the present disclosure, a computer-implemented method for improving computer-based dialogs is disclosed. The method includes: converting a computer-based dialog model to a machine learning model with a plurality of states and a set of actions to move from one state to another state; monitoring one or more runtime user interactions with the machine learning model; applying reinforcement learning to support the runtime user interactions; dynamically updating the machine learning model with results of the runtime user interactions; and applying the updates from the machine learning model to the computer-based dialog model to generate an updated computer-based dialog. Applying the updates automatically triggers a call for subject matter expert review and revision of the updated computer-based dialog.

Briefly, according to another embodiment of the present disclosure, an information processing system for improving computer-based dialogs includes at least a processor device and a memory operably coupled with the processor device. The memory stores computer-executable instructions that cause a computer to perform: converting a computer-based dialog model to a machine learning model with a plurality of states and a set of actions to move from one state to another state; monitoring one or more runtime user interactions with the machine learning model; applying reinforcement learning to support the runtime user interactions; dynamically updating the machine learning model with results of the runtime user interactions; and applying the updates from the machine learning model to the computer-based dialog model to generate an updated computer-based dialog.

Briefly, according to another embodiment of the present disclosure, a computer program product for improving computer-based dialogs includes a non-transitory computer-readable storage medium with instructions stored thereon, the instructions including: converting a computer-based dialog model to a machine learning model with a plurality of states and a set of actions to move from one state to another state; monitoring one or more runtime user interactions with the machine learning model; applying reinforcement learning to support the runtime user interactions; dynamically updating the machine learning model with results of the runtime user interactions; and applying the updates from the machine learning model to the computer-based dialog model to generate an updated computer-based dialog.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
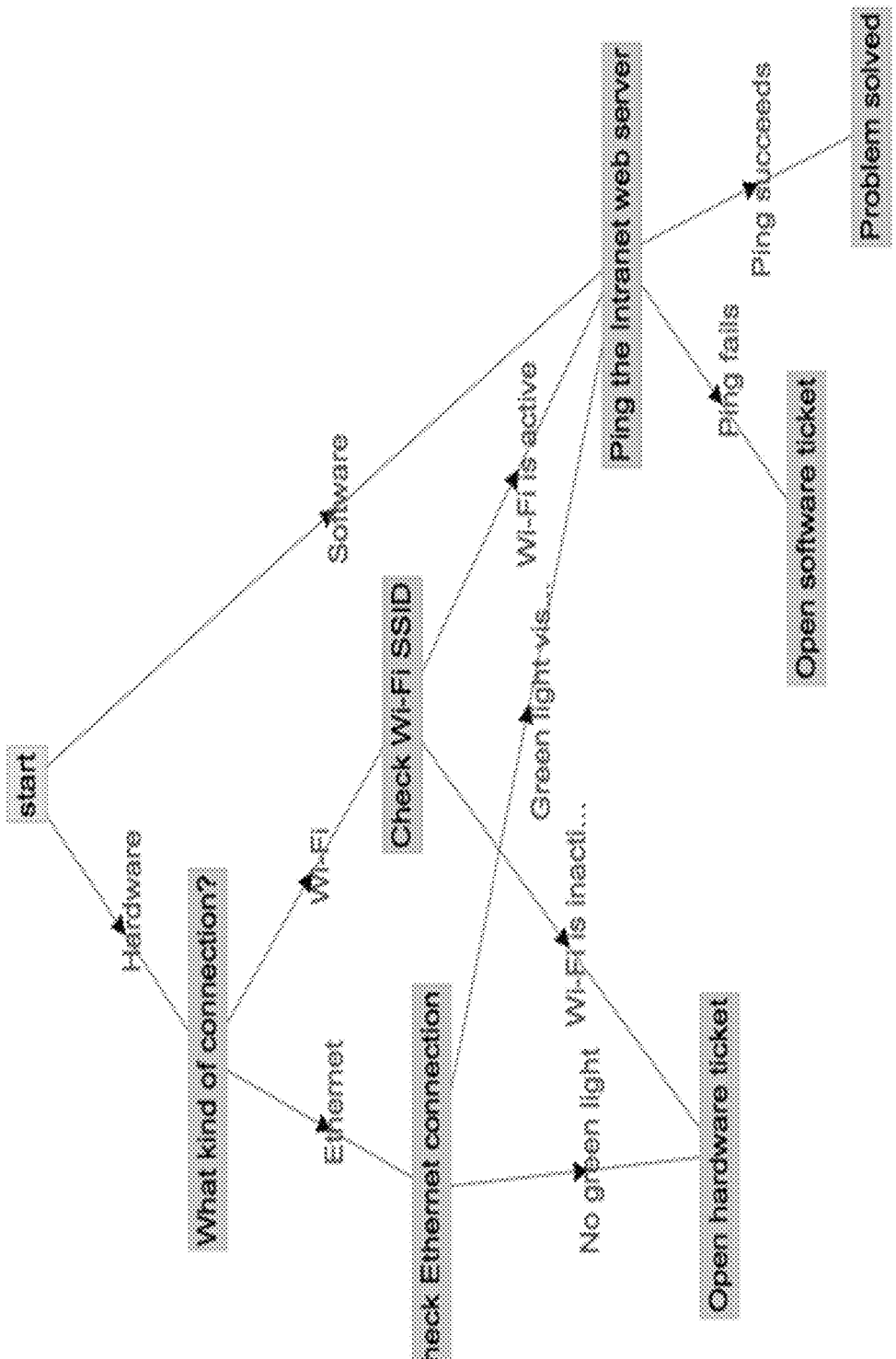
FIG. 1 is an example of a procedure dialog applied to the diagnosis of a connectivity problem.
Figure 2:
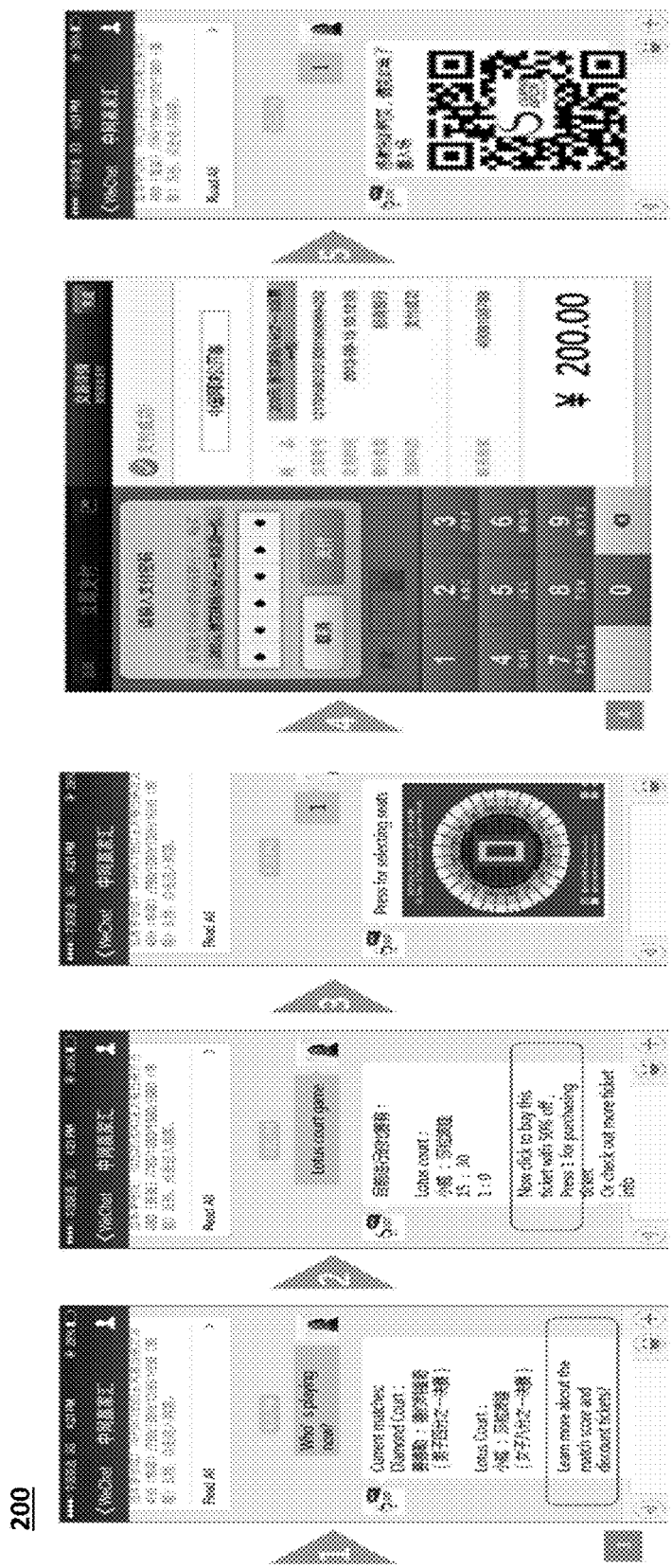
FIG. 2 shows a real-world example of a procedure dialog system implemented as an application supporting ticket purchase and event information services.

FIGS. 1 and 2—Procedure Dialog

Procedure Dialogs are well-defined domain-specific knowledge models based on a conversational dialog. They can be arranged in, for example, a graph or a tree format. A Procedure Dialog can guide a user on how to perform a task within a computer-based dialog system. The models may be trained on training data collected from actual user interactions. Referring now to FIG. 1, there is shown a real-world example of the implementation of procedural knowledge as a Procedure Dialog. The graph 100 of FIG. 1 illustrates how connectivity problems might be diagnosed by following a Procedure Dialog.

The dialog may begin as follows: "If you are unable to reach the company intranet website, you may have a hardware problem, a software problem or possibly both. If you are unsure of the kind of problem you have, start with the hardware section and then go on to the software tips." After the user selects "Hardware," the dialog commences: "If you have a wired connection, ensure that the Ethernet cable is plugged in to the Ethernet port on your laptop and that the green light is lit. If the cable is plugged in but you do not see a light, open an IT trouble ticket. Alternatively if your laptop has a wireless connection, ensure that Wi-Fi is enabled. If this is the case, ensure that the SSID is set to CORPORATE-WIRELESS. If the Wi-Fi icon still remains disabled, check knowledge base entry KB 2346 for more details."

This is the dialog that may follow a user's selection of "Software:" "Determine whether you can access the corporate intranet. Open a command window by typing the word cmd in the Windows search field and then within the command window, enter the command ping w3.testcompany.com. If the command fails, try to renew your IP address using the command ipconfig/renew. If this command fails, open an IT problem ticket."

FIG. 2 is one example of the use of a procedural dialog system supporting ticket purchase and event information services to participants through WeChat® by Tencent Inc., the leading mobile messaging platform in China. The dialog begins with the user's input question "Who's playing now?"

After an automated conversational assistant user interface provides a response, the dialog continues, guiding the user through seat selection and purchase.

Defining Procedure Dialogs remains a manual task. Applying Machine Learning approaches to automatically learn and generate answers to support user interactions is one way to address the dialog authoring issue. However, the application of Machine Learning raises additional issues. Employing a traditional machine learning approach (which can be automated) using Machine Learning models has its shortcomings.

Figure 3:
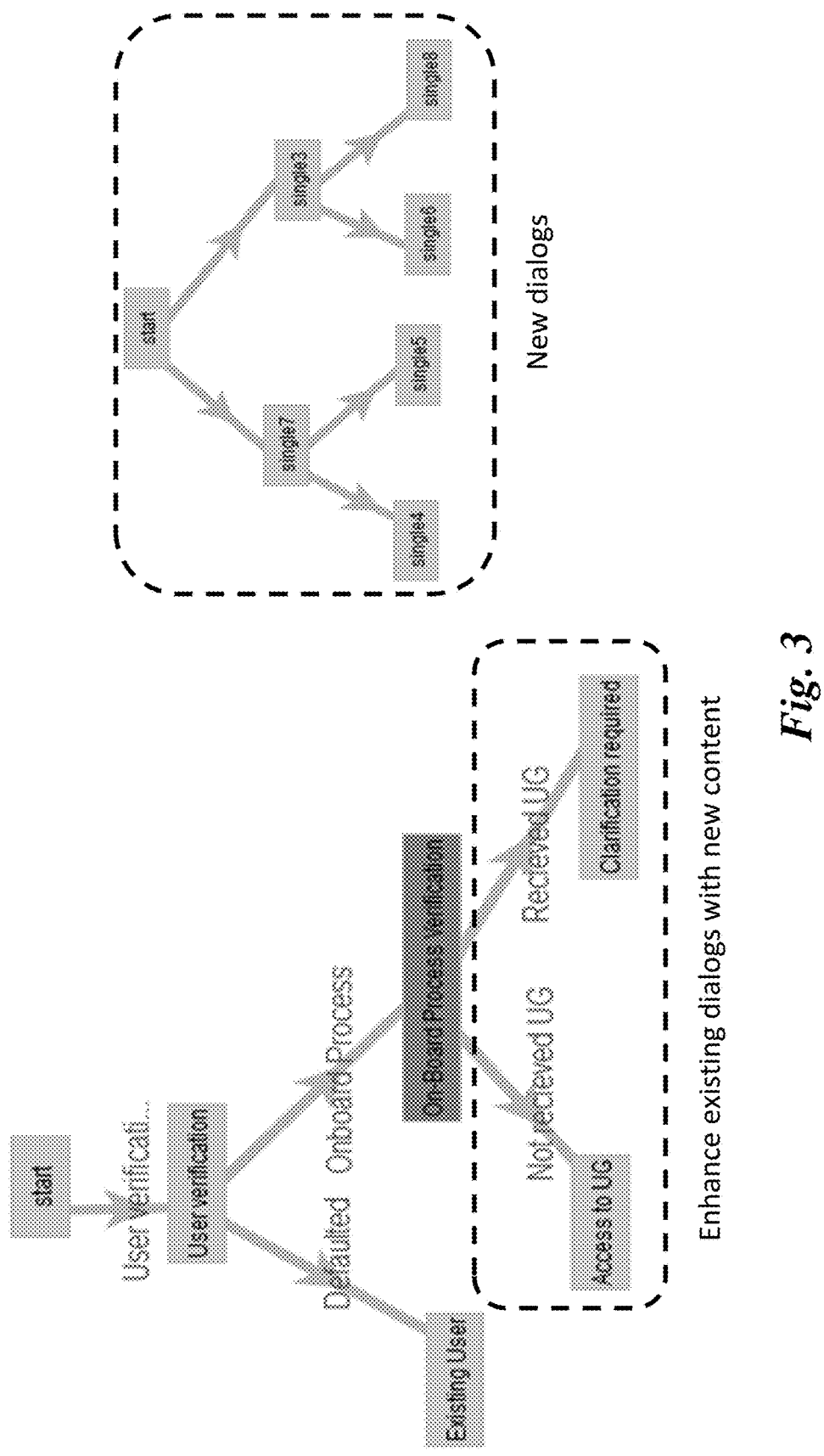
FIG. 3 is an example of knowledge mining contributing to a procedure dialog.

FIG. 3—Knowledge Mining

Knowledge mining using Subject Matter Experts (SMEs) is one solution. Subject Matter Experts are able to review dialog structures as well as the content at each node, and provide up-to-date information. Subject Matter Experts can remove nodes, change descriptions, change node names, and so on. FIG. 3 shows a graphical representation of how Subject Matter Experts can contribute to knowledge mining within a Procedure Dialog used for undergraduate student (UG) registration. The left example shows that new content can be added to the existing dialog and can also be used to create an entirely new dialog.

Before any interaction with external resources is introduced, the dialog has the following structure:

A "Start" node gives the instruction to the user and prompts the user to select the "User Verification" node;

The "User verification" node checks with the user whether he/she already has an account (i.e., existing user) or he/she is a newcomer (which requires on-boarding process);

The "On-board process verification" node verifies the on-board process.

Knowledge mining from conversation histories reveals that we need to further check whether this user has received an undergraduate degree or not, as the registration for these two types of users is different. Therefore, two more branches: "not received UG" (target node is "Access to UG") and "received UG" (target node is "clarification required") are linked to the "On-board process verification" node. The "Access to UG" node provides registration instructions for those who have not received undergraduate degrees. The "clarification required" node requires the user to further clarify why he/she wants to register as an undergraduate given that she/he already has one UG degree. The example on the right shows that the whole new dialog can be mined; i.e., it is derived from supplemental input and it is not related to any existing dialog.

Although Subject Matter Experts can easily understand and define graph-based procedure dialogs, they have difficulty in understanding Machine Learning models, which can be complex. Because Subject Matter Experts cannot read Machine Learning models, they cannot continuously contribute to the generated Machine Learning models. Therefore, after applying extensive Machine Learning approaches to generate and iteratively update Machine Learning models from existing Procedure Dialogs, it becomes impossible to involve the efforts of Subject Matter Experts. The different solutions discussed above provide some benefit; however, there is a need for a method to increase the success rate of message handling.

We discuss a novel technological improvement to Procedure Dialog authoring, wherein Machine Learning approaches are applied to Procedure Dialogs within a Reinforcement Learning framework. Using Reinforcement Learning-supported user interactions to update a Machine Learning model, we are able to seamlessly incorporate Subject Matter Experts' (SMEs) contributions to improve existing Procedure Dialogs and add new dialogs, thus improving automated message handling. We take a computational approach to reinforcement learning to facilitate the automatic knowledge mining and Procedure Dialog authoring, such that Subject Matter Experts can continuously contribute to the Procedure Dialog knowledge mining.

Reinforcement Learning is a Machine Learning approach to adaptive intelligence that focuses on goal-directed learning with knowledge gleaned from interaction with end users and with other external sources. Reinforcement Learning is a model that adapts its behavior to achieve a goal. It is different than supervised learning, which is focused on learning through examples supplied by experts; however Reinforcement Learning can include aspects of supervised learning. A full discussion on research learning is outside the scope of this disclosure. More information can be found in "Reinforcement Learning: An Introduction," by Richard S. Sutton and Andrew G. Barto, 2012.

Figure 5:
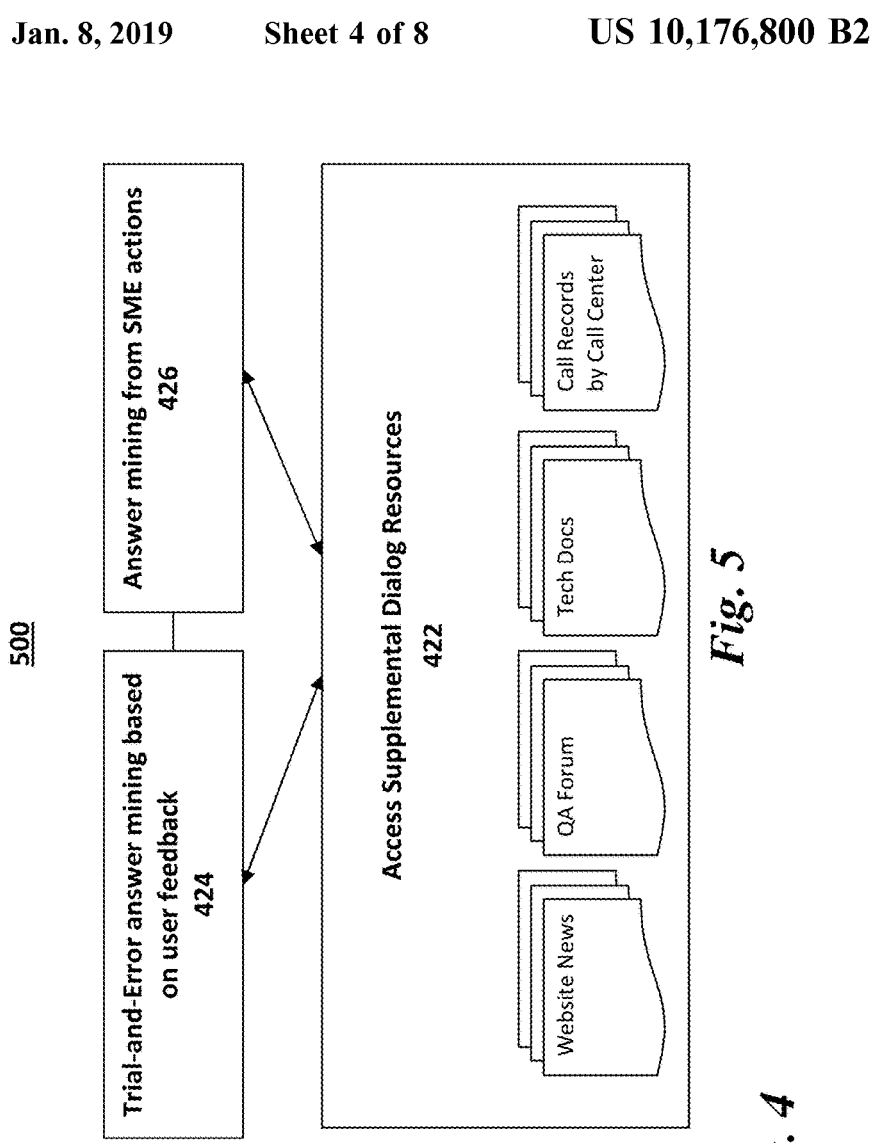
FIG. 5 shows a lower-level data flow diagram for updating a procedure dialog, using runtime user interactions.
Figure 4:
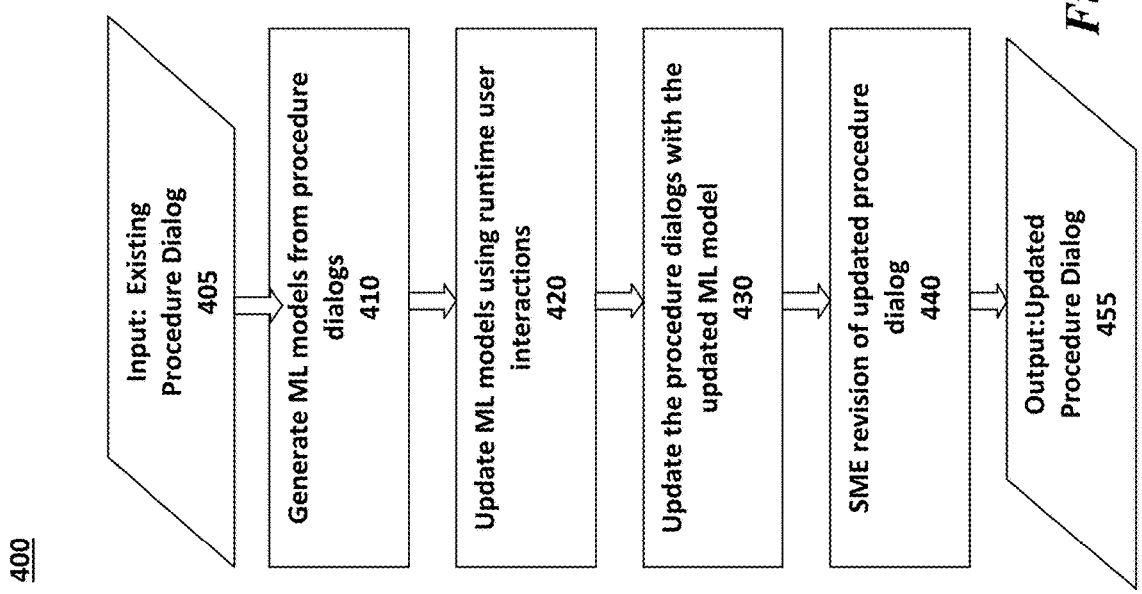
FIG. 4 shows a high-level data flow diagram of the process of automatic procedure dialog knowledge mining.

FIGS. 4 and 5—Data Flow Diagram

The automatic Procedure Dialog knowledge mining process has four major technical steps: 1) transform a Procedure Dialog to a Machine Learning model; 2) introduce Subject Matter Expert knowledge through user interaction; 3) update the Machine Learning model; and 4) revise the Procedure Dialog using external sources. Referring now to FIG. 4 there is shown a data flow diagram 400 of the process for automatic Procedure Dialog knowledge mining. The input to the process is an existing Procedure Dialog 405, whether created manually or automatically. In step 410 we first transform the Procedure Dialog into a probabilistic Machine Learning model such as a POMDP (Partial Observable Markov Decision Process) model by generating a detailed instance and defining key concepts such as state, action, and reward. Those with knowledge in the art will understand that other probabilistic models can be used, such as a Markov Decision Process (MDP) model.

In step 420, the system then monitors end user interactions with the Machine Learning model, while applying Reinforcement Learning to support the interactions with end users. The system dynamically updates the probabilistic Machine Learning model, such as, for example, by updating the transition probability and/or updating the immediate or real-valued reward for actions among states in the POMDP model. In step 430, the system identifies and isolates the updates that were made to the Machine Learning model and transforms those updates to human-readable updates, applying the human-readable updates to existing Procedure Dialogs (which may be candidates for new dialogs) so that Subject Matter Experts can understand and contribute to the revisions. In step 440, knowledge mining from within the Reinforcement Learning framework is introduced again to verify the updates and to support the interactive Reinforcement Learning during user interactions. The outcome is a revised Procedure Dialog 455.

FIG. 5 shows a lower-level data flow diagram 500 of how Machine Learning models are updated using runtime user interactions. Using supplemental knowledge resources 422, we employ trial-and-error answer mining in step 424, wherein mining the answers comprises using a trial and error approach with user feedback. The user feedback provides the direction, as well as the training data. Alternatively, or in combination, we can also employ knowledge mining from Subject Matter Experts in step 426. Some examples of supplemental knowledge resources 422 are: website news, on-line QA forums, technical documents, and call records from a call center. Those with knowledge in the art will understand that these are just a few examples of the resources that can be mined, within the spirit and scope of the disclosure.

Figure 6:
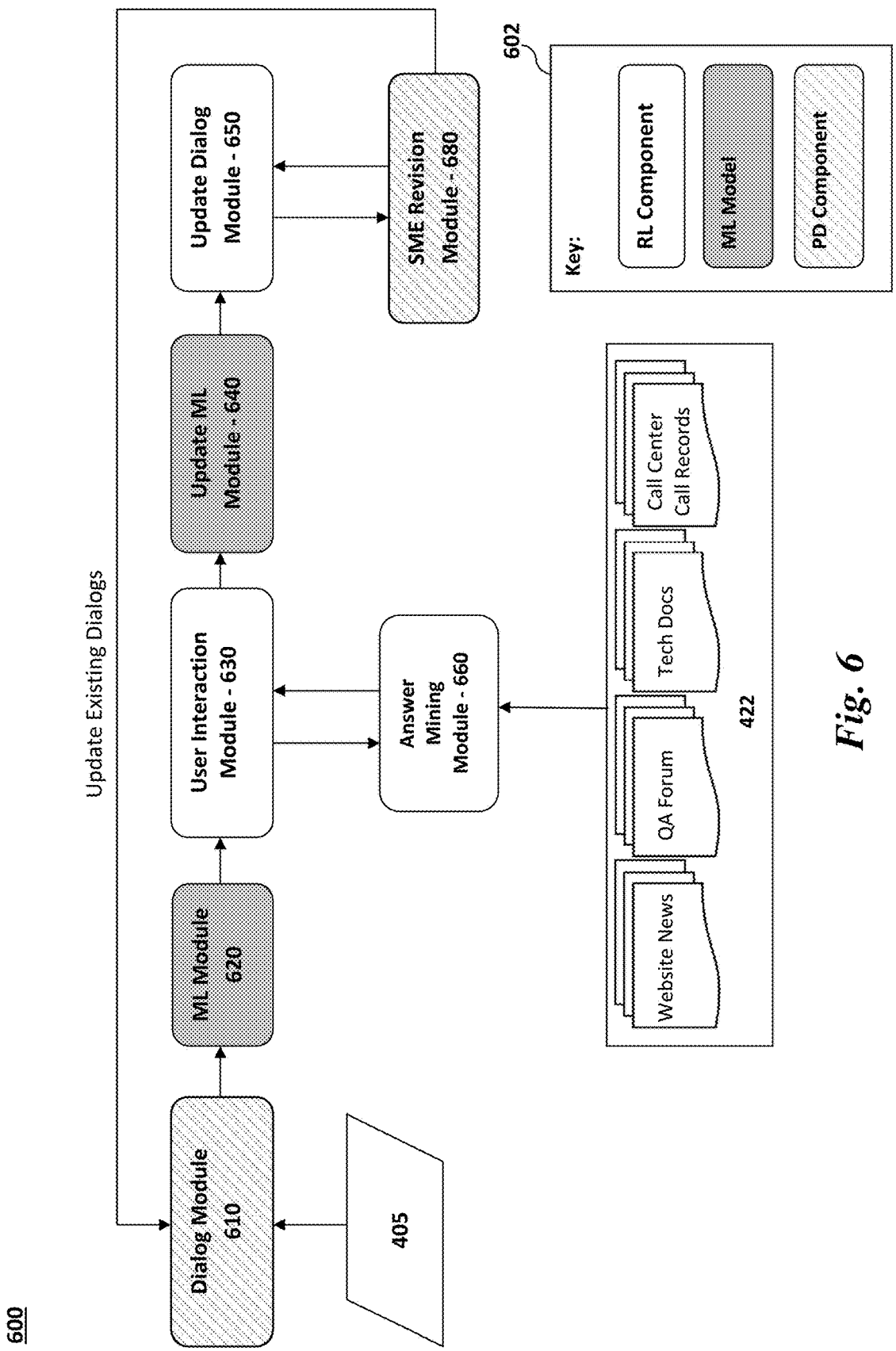
FIG. 6 shows a process flow diagram of the process for updating a procedure dialog, using runtime user interactions.

FIG. 6—Automatic Procedure Dialog Knowledge Mining System

FIG. 6 shows one example of a system 600 for automatic Procedure Dialog knowledge mining, according to an embodiment of the present disclosure. The system 600 can be configured as an automated conversational assistant implemented as a mobile application, such as the conversational assistant mobile application shown in FIG. 2 which enables users to query match information and buy tickets through a free chat session.

The inputs to the system 600 are the existing Procedure Dialogs 405, supplemental knowledge resources 422 and Subject Matter Expert input. According to one embodiment, the system 600 includes seven modules: a Dialog Module 610, a Machine Learning Module 620, a User Interaction Module 630, an Update Machine Learning Module 640, an Update Dialog Module 650, a Subject Matter Experts Revision Module 680, and an Answer Mining Module 660.

The Dialog Module 610 offers storage of Procedure Dialogs such as Procedure Dialog 405. The Dialog Module 610 also provides user interfaces to maintain the Procedure Dialogs through user input. The Procedure Dialogs are taken as input to the Machine Learning Module 620. The Machine Learning Module 620 converts the existing Procedure Dialog 405 into a Machine Learning model such as a POMDP model. The dialog 405 is transformed into a Machine Learning model such as a POMDP model by defining: a set of states, actions, and rewards. A more detailed explanation follows the discussion of FIG. 7.

The User Interaction Module 630. It is through the user interfaces that the end user interacts with the Machine Learning model, expressed as an automated conversational assistant. Additionally, the User Interaction Module 630 monitors the end user's runtime interactions with the Machine Learning model and employs the Answer Mining Module 660 to access domain-specific knowledge from domain-specific knowledge repositories such as supplemental resources 422 to answer user queries. The domain-specific knowledge repositories are maintained by Subject Matter Experts. The Answer Mining Module 660 incorporates the input from the supplemental resources 422.

The Update Machine Learning Module 640 applies the Reinforcement Learning-supported user interactions from the Answer Mining Module 660 to update the Machine Learning model with the new information. Next, the Update Dialog Module 650 takes the updates applied to the Machine Learning model and incorporates counterpart updates to the existing Procedure Dialog 405. Updating the Procedure Dialog 405 triggers a call to the Subject Matter Expert Revision Module 680 which notifies the appropriate Subject Matter Expert(s) to review and possibly revise the updated Procedure Dialog as part of Reinforcement Learning. We apply this component of Reinforcement Learning to the computed dialog updates on existing Procedure Dialogs 405 to make the updates compatible with Subject Matter Experts so that the Subject Matter Experts can understand and contribute to the revision. Note that as the number of Procedure Dialogs is limited at the beginning, new model states will be introduced.

We note that Reinforcement Learning can be used for runtime user interaction, answer mining, and computing updates to existing dialogs. A key 602 identifies whether each module is a Reinforcement Learning component, a Machine Learning component, or a Procedure Dialog component.

Figure 7:
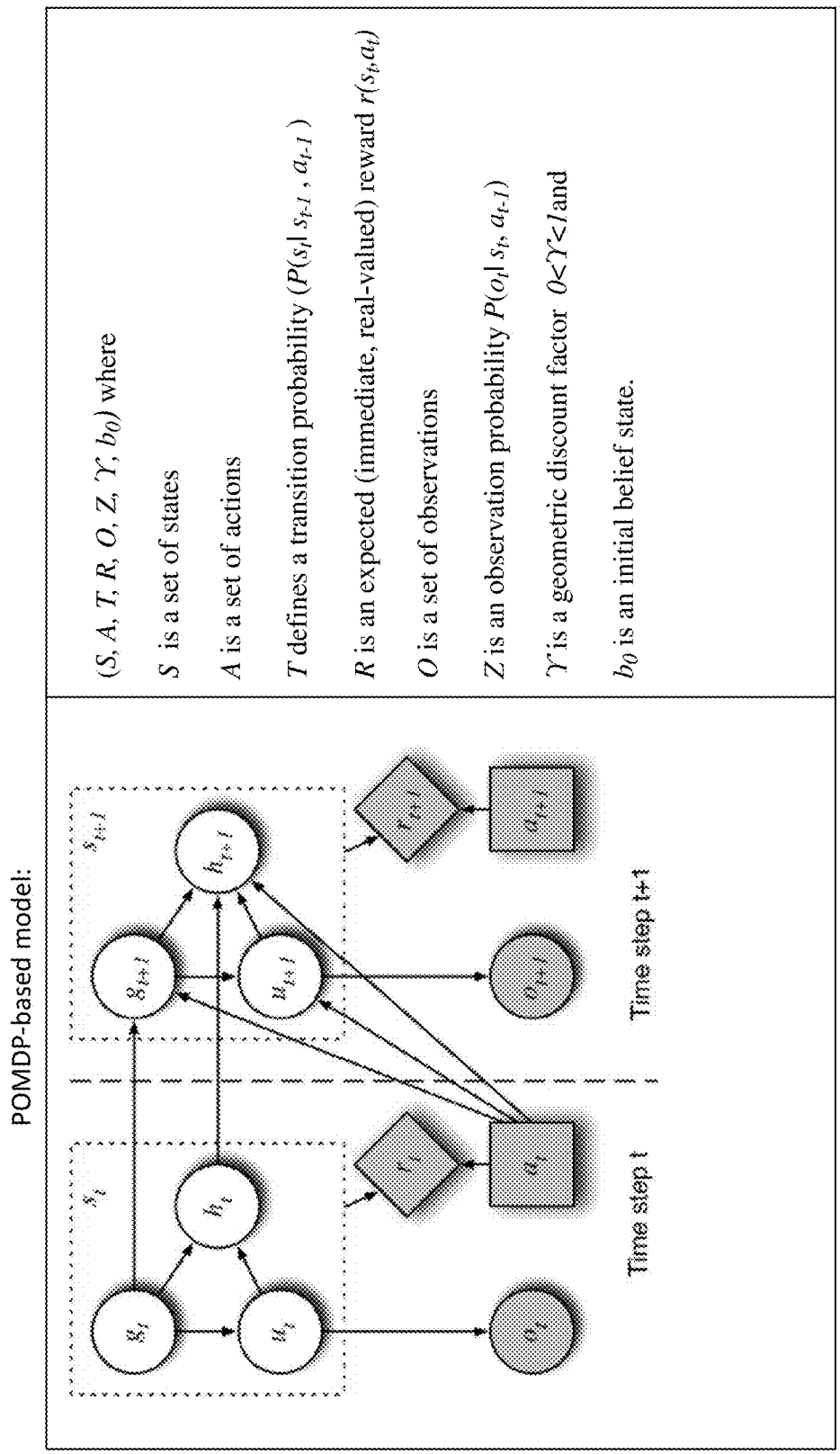
FIG. 7 shows a simplified example of a decision process model.

FIG. 7—Converting a Procedure Dialog

Referring now to FIG. 7 we show an example of a POMDP model 700. The Procedure Dialog 405 such as the one shown in FIG. 1 can be transformed into a Machine Learning model such as a POMDP model by defining (S, A, T, R, O, Z, $\Upsilon$, $b_0$) where:

S is a set of states of the environment

A is a set of possible actions taken by the automated conversational assistant

T defines a transition probability $P(s_t|s_{t-1}, a_{t-1})$

R is an expected (immediate, real-valued) reward $r(s_t,a_t)$ of starting in state s, performing action a, and transitioning to state s' is a set of observations Z is an observation probability $P(o_t|s_t, a_{t-1})$ $\Upsilon$ is a geometric discount factor $0<\Upsilon<1$ and $b_0$ is an initial belief state.

S: State Definition: $S_t=(g_t, u_t, h_t)$, where:

$g_t$: user goal (e.g., first question)

$u_t$: the intent of the most recent user utterance (e.g., topic from latest user input); user intent statements can be pulled from search query logs and dialog interactions $h_t$: conversation history, a sequence of questions and answers <q, a>

State Examples:

$$S_1=(g_1,u_1,h_1)$$

$g_1$: "My laptop cannot connect to the network, what is the problem?"

$u_1$: "Fix network connection issue"

$h_1$: { }

$$S_2=(g_2,u_2,h_2)$$

$g_2$: "My laptop cannot connect to the network, what is the problem?"

$u_2$: "not sure"

$h_2$: {<"My laptop cannot connect to the network, what is the problem?", "Do you think it is a hardware issue or a software issue, or you are not sure?">}

A: Action Definition: direct or indirect user feedback; causes the environment to transition from state s to state s'

Examples of Direct User Feedback:

Refining comments from choice selections (e.g., "1"/"2" or "day"/"night")

Closing comments such as "Thanks," "ok," "that's it"

Transition comments such as "that's not what I want"

Examples of Indirect User Feedback:

Ask a similar question ("how to get there," "how to get to your place")

No follow-up within a period ("how much is outside ticket? 30," maybe the user already gets what he/she needs)

Followed with a new question ("how much is outside ticket? 30," "how to buy it")

Action-1: $a_1$="hardware"

Action-2: $a_2$="software"

Action-3: $a_3$="I am not sure"

Action-4: $a_4$="thanks"

Action-5: $a_5$="that's not what I want"

Action-6: $a_6$="how to get there"

T: Transition definition: The transition probability defines the probability of transitioning from one state to another state. Transition probability is initialized with a random value, and then updated during runtime conversations.

Referring to the state examples above, the transition probability of transitioning from states $s_1$ to $s_2$ for actions $a_1$, $a_2$, and $a_3$ is assumed as:

$P(s_2|s_1, a_1)=0.2$
$P(s_2|s_1, a_2)=0.2$
$P(s_2|s_1, a_3)=0.9$

In real practice, when given action $a_k$ at state $s_i$, the transition probability $P(s_j|s_i, a_k)$ is calculated by the number of transitions from state $s_i$ to state $s_j$ divided by the number of transitions from state $s_i$ to all states.

R: reward value. A reward is given based on the state type and relative state position in the conversation. The goal is for the automated conversational assistant to select those actions at each time (t, t+1) that maximizes an expected reward value, such as:

Refining State Reward Value: 50 (This state refines previous state by asking a question closer to the final answer)

Transition state reward value: −100 (This state finds out that current dialog model cannot solve the problem)

Closing State reward value: −100 (This state gives the final answer to the user's query)

Here are some examples of rewards:
Conversation-1:
A: My laptop cannot connect to the network, what is the problem?
B: Do you think it is a hardware issue or a software issue, or you are not sure?
A: I am not sure. (Reward: 50)
B: What kind of connection are you using, Ethernet or WIFI?
A: It is Ethernet. (Reward: 50)
B: Please check your Ethernet connection, is there a green light?
A: There is no green light. (Reward: 50)
B: Please raise a hardware ticket. (Reward: 100)
Conversation-2:
A: My laptop cannot connect to the network, what is the problem?
B: Do you think it is a hardware issue or a software issue, or you are not sure?
A: I am not sure. (Reward: 50)
B: What kind of connection are you using, Ethernet or WIFI?
A: My connection is none of those. (Reward: −100)

O: a set of observations. The automated conversational assistant uses observations to determine the current state.
Observation-1 ($o_a$): User response
Observation-2 ($o_b$): User response time
Observation-3 ($o_c$): User satisfaction
Z: observation probability $P(o_t|s_t, a_{t-1})$
$P(o_{a,2}|s_2, a_1)=1$
$P(o_{b,2}|s_2, a_1)=1$
$P(o_{c,2}|s_2, a_1)=0.3$ $\Upsilon$: geometric discount factor $0<\Upsilon<1$ where is an experienced parameter, for example, $\Upsilon=0.3$. The discount factor is a function of how much the automated conversational assistant favors immediate rewards versus future rewards.

$b_0$: initial belief state; $b_0=S_1$. The automated conversational assistant updates its belief state after taking an action a and observing o.

Examples of States among dialogs:
a) Question state: "which player do you want to watch?"
b) Instruction state: "please pick up your ticket at Gate 2"
c) Assertion state: "the input id is incorrect"

Figure 8:
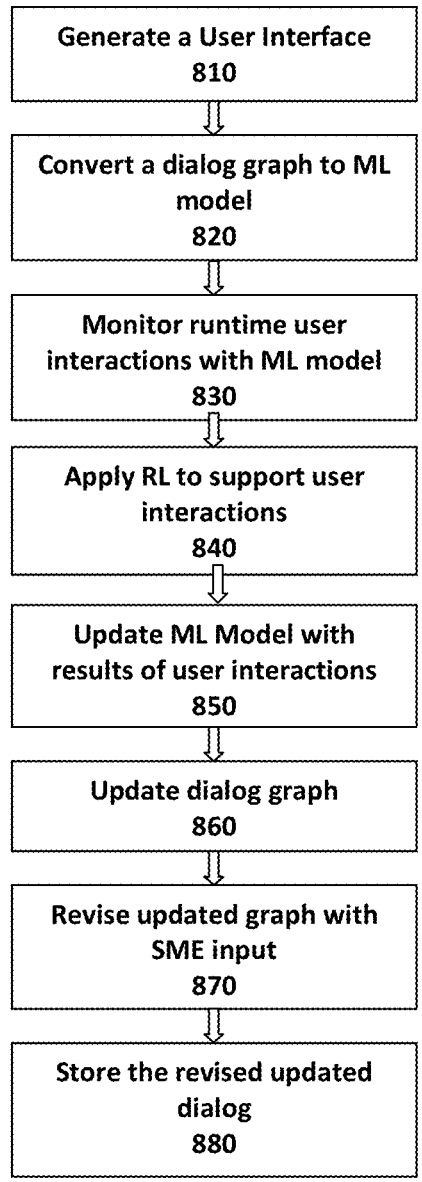
FIG. 8 shows a flow chart of a method for automatic procedure dialog knowledge mining.

Examples of States within a dialog:
Refining state: This state refines previous state by asking a question closer to the final answer.
Transition state: This state finds out that current dialog model cannot resolve the user issue/request
Closing state: this state gives the final answer to user's question FIG. 8—Flow Chart of Process Implementation Referring now to FIG. 8, we show a flow chart 800 of an implementation of the method for automatic Procedure Dialog knowledge mining, according to one embodiment of the disclosure. This process is a learning process that can be conducted at intervals (e.g., every week, or every month). In step 810 a graphical user interface is generated by the Procedure Dialog Module 610. The graphical user interface can be generated as an automated conversational assistant mobile application on a user's mobile device, such as in the example of FIG. 2. The user interacts with the automated conversational assistant through the user interface, by inputting queries and responses. Next, in step 820 the Procedure Dialog 405 is converted to a Machine Learning model to facilitate user interaction. The user interaction is monitored in step 830 by the User Interaction module 630. Concurrently, in step 840, Reinforcement Learning is applied to support the user interactions. For example, the automated conversational assistant performs answer mining to broaden its knowledge base. Supplemental resources 422 such as Website News, QA Forums, Technical Documents, and Call Center Call Records can be mined for knowledge. These resources 422 are domain-specific and maintained by Subject Matter Experts.

In step 850, the Machine Learning model is updated to include results of the monitored user interactions. For example, new nodes may be added to, moved, or deleted from the model according to results of the dialog with the user and the additional support from answer mining. Because Subject Matter Experts cannot easily contribute to a Machine Learning model, the Procedure Dialog 405 is updated to reflect the changes made to the Machine Learning model in step 860.

Next, the updated Procedure Dialog 405 is reviewed and revised by Subject Matter Experts in step 870. Note that Subject Matter Expert input can also be included in the answer mining of step 840. The reason that the automated conversational assistant again seeks out Subject Matter Expert knowledge in step 870 is because at step 840, a Subject Matter Expert may only consider part of the whole Procedure Dialog (e.g., only considering the current conversation history), and thus the contributed Subject Matter Expert knowledge may conflict with other parts of the whole Procedure Dialog.

At Step 870, Subject Matter Experts need to verify and revise the dialog from a global view, before the knowledge is persisted. Introducing Subject Matter Expert knowledge to the dialog is automated as follows. When any dialog updates are automatically included in step 860, the automated conversational assistant alerts a corresponding Subject Matter Expert, such as, for example, the author of the Procedure Dialog 405 to be updated, that updates were applied and need to be reviewed. After review and possible revision by Subject Matter Experts, the updated Procedure Dialog 405 is stored in step 880.

Figure 9:
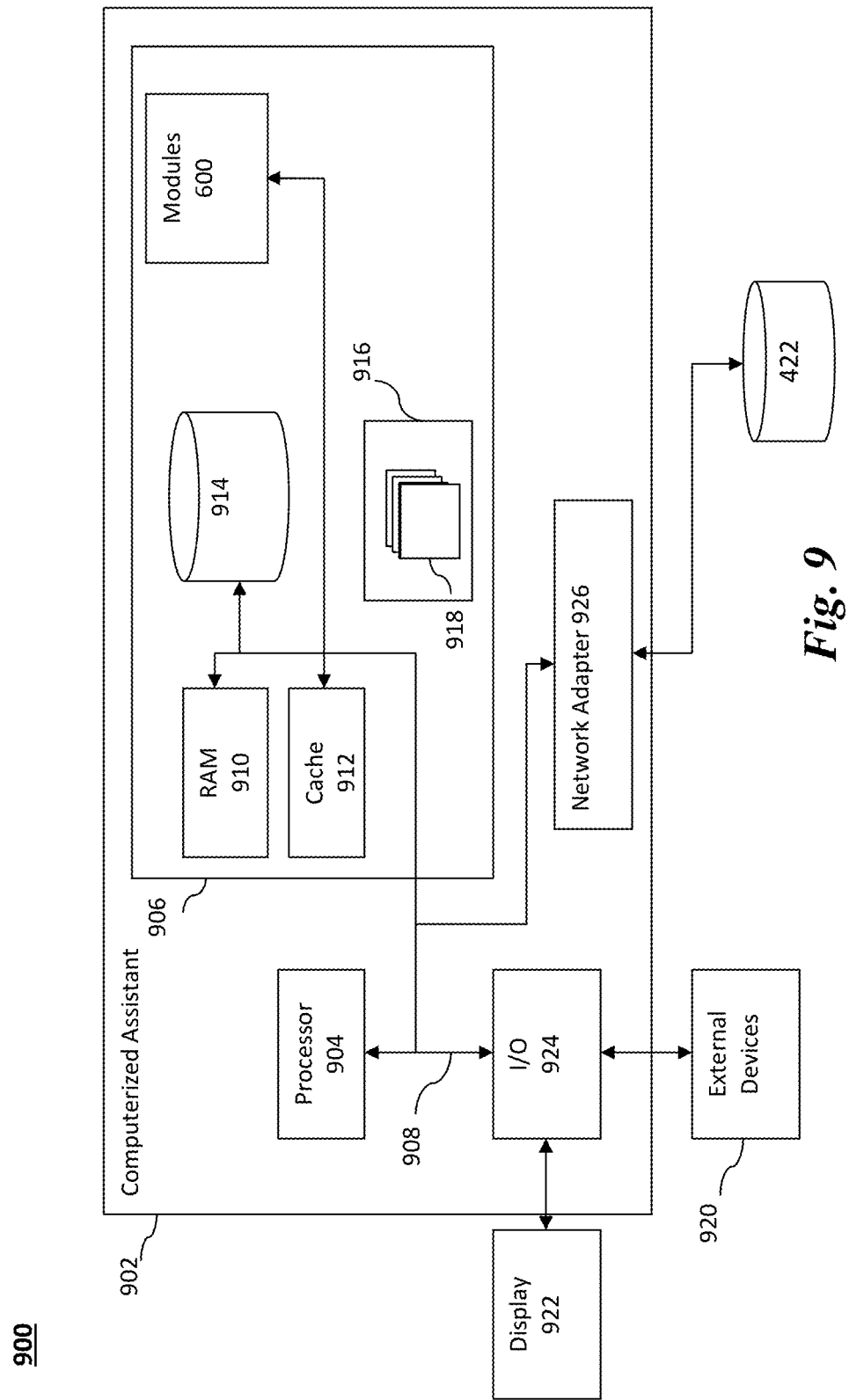
FIG. 9 is a block diagram illustrating an information processing system.

Hardware Embodiment—FIG. 9

FIG. 9 illustrates one example of the components of an information processing system 900 for procedure graph authoring that can be utilized in various embodiments of the present disclosure. The information processing system 900 shown in FIG. 9 is only one example of a suitable system and is not intended to limit the scope of use or functionality of embodiments of the present disclosure described above. The information processing system 900 of FIG. 9 is capable of implementing and/or performing any of the functionality set forth above. Any suitably configured processing system can be used as the information processing system 900 in embodiments of the present disclosure.

The information processing system 900 is operational with numerous other general purpose or special purpose computing system environments or configurations. Examples of well-known computing systems, environments, and/or configurations that may be suitable for use with the information processing system 900 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The information processing system 900 may be described in the general context of computer system-executable instructions, being executed by a computer system. Generally, program modules such as the modules 600 shown in FIG. 6 may include routines, programs, objects, components, logic, data structures, and so on that perform particular tasks or implement particular abstract data types. Modules 600 are depicted in FIG. 6 as separate hardware components; however the modules 600 can be embodied as hardware, software, or a combination of hardware and software. The tasks performed by the modules 600 can be distributed across devices. The information processing system 902 may be practiced in various computing environments such as conventional and distributed cloud computing environments where tasks are performed by remote processing devices that are linked through a communications network. In a distributed cloud computing environment, program modules may be located in both local and remote computer system storage media including memory storage devices.

As illustrated in FIG. 9, the information processing system 900 includes the automated conversational assistant 902 in the form of a general-purpose computing device. The components of the automated conversational assistant 902 can include, but are not limited to, one or more processor devices or processing units 904, a system memory 906, and a bus 908 that couples various system components including the system memory 906 to the processor 904.

The bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 906, in one embodiment, comprises the automatic procedure dialog authoring modules 600 of FIG. 6. Even though FIG. 9 shows the modules 600 residing in the main memory, the modules 600 or at least one of their components can reside within the processor 904, be a separate hardware component, and/or be distributed across a plurality of information processing systems and/or processors.

The system memory 906 can also include computer system readable media in the form of volatile memory, such as random access memory (RAM) 910 and/or cache memory 912. The automated conversational assistant 902 can further include other removable/non-removable, volatile/non-volatile computer system storage media. By way of example only, a storage system 914 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 908 by one or more data media interfaces. The memory 906 can include at least one program product having a set of program modules that are configured to carry out the functions of an embodiment of the present invention.

Program/utility 916, having a set of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of embodiments of the present invention.

The automated conversational assistant 902 can also communicate with one or more external devices 920 such as a keyboard, a pointing device, a display 922, etc.; one or more devices that enable a user to interact with the automated conversational assistant 902; and/or any devices (e.g., network card, modem, etc.) that enable the automated conversational assistant 902 to communicate with one or more other computing devices. Such communication can occur via I/O interfaces 924. Still yet, the automated conversational assistant 902 can communicate with one or more networks such as a local area network (LAN), a general wide area network (WAN), and/or a public network (e.g., the Internet) via network adapter 926, enabling the system 902 to access a knowledge repository such as supplemental knowledge resources 422. As depicted, the network adapter 926 communicates with the other components of i automated conversational assistant 902 via the bus 908. Other hardware and/or software components can also be used in conjunction with the automated conversational assistant 902. Examples include, but are not limited to: microcode, device drivers, redundant processing units, external disk drive arrays, RAID systems, tape drives, and data archival storage systems.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, although not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, although not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including although not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been discussed above with reference to flowchart illustrations and/or block diagrams of methods, apparatus (systems) and computer program products according to various embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable storage medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, although do not preclude the presence or addition of one or more other features, integers, steps, operations, elements, components, and/or groups thereof.

The description of the present disclosure has been presented for purposes of illustration and description, however it is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method for improving computer-based dialogs, the computer-implemented method comprising:
   generating an automated conversational assistant on a user device, the automated conversational assistant comprising a graphical user interface for enabling user interaction with a computer-based dialog model;
   converting the computer-based dialog model to a machine learning model comprising a plurality of states with a set of actions to move from one state to another state;
   monitoring one or more runtime user interactions with the machine learning model;
   applying reinforcement learning to support the runtime user interactions with the machine learning model, the reinforcement learning applying data mined from supplemental knowledge resources to provide answers directed to a current dialog;

dynamically updating the machine learning model with results of the reinforcement learning applied to the runtime user interactions, wherein new states are introduced to the machine learning model;

generating an updated computer-based dialog model with updates from the machine learning model;

wherein applying the updates to the computer-based dialog model triggers a notification to a corresponding subject matter expert to review and revise the updated computer-based dialog model from a global view, after which the updated and revised computer-based dialog model is stored; and using the updated and revised computer-based dialog model in a subsequent dialog via the automated conversational assistant.

2. The computer-implemented method of claim 1 wherein converting the computer-based dialog model comprises generating a detailed instance using a probabilistic learning model and defining a set of states S, a set of possible actions A, a transition probability T, and an expected reward R for performing action a and transitioning from state s to s'.

3. The computer-implemented method of claim 2 wherein dynamically updating the machine learning model comprises at least one of: updating the transition probability T, and updating a reward R for actions A among states S in the probabilistic learning model.

4. The computer-implemented method of claim 1 wherein revising the updated computer-based dialog comprises generating a new procedure dialog.

5. The computer-implemented method of claim 1 wherein the state is defined as a function of a user goal, an intent of a most recent user utterance, and a conversation history.

6. The computer-implemented method of claim 1 wherein the set of actions comprise direct user feedback and indirect user feedback.

7. The computer-implemented method of claim 1 wherein applying the reinforcement learning comprises:
   accessing the supplemental knowledge resources; and
   mining answers from the supplemental knowledge resources.

8. The computer-implemented method of claim 7 wherein mining the answers comprises using a trial and error approach with user feedback providing directions and training data.

9. The computer-implemented method of claim 7 wherein mining the answers comprises incorporating input from a domain-specific knowledge repository maintained by subject matter experts.

10. An information processing system for improving computer-based dialogs, comprising:
   a processor device; and
   a memory operably coupled with the processor device and storing computer-executable instructions causing a computer to perform:
      generating an automated conversational assistant on a user device, the automated conversational assistant comprising a graphical user interface for enabling user interaction with a computer-based dialog model;
      converting the computer-based dialog model to a machine learning model comprising a plurality of states with a set of actions to move from one state to another state;
      monitoring one or more runtime user interactions with the machine learning model;
      applying reinforcement learning to support the runtime user interactions with the machine learning model, the reinforcement learning applying data mined from supplemental knowledge resources to provide answers directed to a current dialog;
      dynamically updating the machine learning model with results of the reinforcement learning applied to the runtime user interactions, wherein new states are introduced to the machine learning model; and
      generating an updated computer-based dialog model with updates from the machine learning model;
      wherein applying the updates to the computer-based dialog model triggers a notification to a corresponding subject matter expert to review and revise the updated computer-based dialog model from a global view, after which the updated and revised computer-based dialog model is stored; and
      using the updated and revised computer-based dialog model in a subsequent dialog via the automated conversational assistant.

11. The information processing system of claim 10 wherein converting the computer-based dialog model comprises generating a detailed instance using a probabilistic learning model and defining a set of states S, a set of possible actions A, a transition probability T, and an expected reward R for performing action a and transitioning from state s to s'.

12. The information processing system of claim 11 wherein dynamically updating the machine learning model comprises at least one of: updating the transition probability T and updating a reward R for actions A among states S in the probabilistic learning model.

13. The information processing system of claim 10 wherein the state is defined as a function of a user goal, an intent of a most recent user utterance, and a conversation history.

14. The information processing system of claim 10 further comprising a domain-specific knowledge repository maintained by subject matter experts.

15. The information processing system of claim 10 wherein applying the reinforcement learning comprises:
   accessing the supplemental knowledge resources; and
   mining answers from the supplemental knowledge resources.

16. The information processing system of claim 15 wherein mining the answers comprises using a trial and error approach with user feedback providing directions and training data.

17. The information processing system of claim 15 wherein mining the answers comprises incorporating input from a domain-specific knowledge repository maintained by subject matter experts.

18. A computer program product for improving computer-based dialogs, the computer program product comprising:
   a non-transitory computer readable storage medium readable by a processing circuit and storing instructions for execution by the processing circuit for performing a method comprising:
      generating an automated conversational assistant on a user device, the automated conversational assistant comprising a graphical user interface for enabling user interaction with a computer-based dialog model;

converting the computer-based dialog model to a machine learning model comprising a plurality of states with a set of actions to move from one state to another state;

monitoring one or more runtime user interactions with the machine learning model;

applying reinforcement learning to support the runtime user interactions with the machine learning model, the reinforcement learning applying data mined from supplemental knowledge resources to provide answers directed to a current dialog;

dynamically updating the machine learning model with results of the reinforcement learning applied to the runtime user interactions, wherein new states are introduced to the machine learning model;

generating an updated computer-based dialog model with updates from the machine learning model;

wherein applying the updates to the computer-based dialog model triggers a notification to a corresponding subject matter expert to review and revise the updated computer-based dialog model from a global view, after which the updated and revised computer-based dialog model is stored; and using the updated and revised computer-based dialog model in a subsequent dialog via the automated conversational assistant.

* * * * *